United States Patent [19]

Ceideburg

[11] 4,052,975
[45] Oct. 11, 1977

[54] SOLAR HEAT COLLECTOR AND STORAGE SYSTEM

[76] Inventor: John W. Ceideburg, P.O. Box 259, Aptos, Calif. 95003

[21] Appl. No.: 688,249

[22] Filed: May 20, 1976

[51] Int. Cl.² .............................................. F24J 3/02
[52] U.S. Cl. ................................................. 126/271
[58] Field of Search .............. 126/271; 237/1 A, 2 B; 62/2

[56] References Cited

U.S. PATENT DOCUMENTS

| | | | |
|---|---|---|---|
| 1,250,260 | 12/1917 | Wilcox | 126/271 |
| 2,660,863 | 12/1953 | Gerhart, Jr. | 126/271 |
| 3,016,801 | 1/1962 | Michel | 126/271 |
| 3,254,703 | 6/1966 | Thomason | 126/271 |
| 3,295,591 | 1/1967 | Thomason | 126/271 |
| 3,366,168 | 1/1968 | Dale | 126/271 |
| 3,513,828 | 5/1970 | Masters | 126/271 |
| 3,875,926 | 4/1975 | Frank | 126/271 |
| 3,958,554 | 5/1976 | Schmidt | 126/271 |
| 3,991,938 | 11/1976 | Ramey | 126/271 |
| 4,007,776 | 2/1977 | Alkasab | 62/2 |
| 4,011,731 | 3/1977 | Meckler | 126/271 |

*Primary Examiner*—Lloyd L. King
*Attorney, Agent, or Firm*—Jessup & Beecher

[57] ABSTRACT

A solar heat collector and storage system for a residential or other building, is provided which comprises an insulated receptacle in the form of a storage tank, which is preferably buried in the ground adjacent to the building, and which contains a liquid solution which has a relatively low freezing point and a relatively high boiling point, and which will not readily evaporate. The liquid solution may, for example, be water and calcium chloride. The liquid solution in the storage tank is pumped to an upper position on the roof of the building, and it is permitted to flow freely over the roof to a lower position, while exposed to the atmosphere, to be heated by the sun during its travel across the roof. The heated liquid solution is collected at the lower position on the roof and returned to the storage tank. The heated liquid solution in the storage tank may be used in any appropriate manner to derive the energy stored in the liquid solution.

6 Claims, 5 Drawing Figures

SOLAR HEAT COLLECTOR AND STORAGE SYSTEM

BACKGROUND OF THE INVENTION

Copending Application Ser. No. 581,785, filed May 29, 1975 in the name of the present inventor, describes an energy storage system in which heat may be stored for prolonged periods of time so as to provide a continuous source of energy, even though the primary energy source which provides the primary heat to the system may be of an intermittent and variable nature. In the particular embodiment disclosed in the Copending Application, a wind operated electric generating unit is described as constituting the primary energy source.

The system forming the subject matter of the Copending Application includes, in one particular embodiment, a storage tank which is buried in the ground, and which contains a liquid with a higher boiling point that water and a sub-zero (Farenheit) freezing point. The liquid, for example, may be a solution of water and calcium chloride. When the liquid solution in the storage tank is heated, it has sufficient capacity to store enough heat to furnish electricity and heat for prolonged periods of time.

Heat may be derived from the liquid solution in the storage tank by circulating water or other liquid, through a coiled pipe in the solution. The water in the coiled pipe is thereby converted to a steam, and the resulting steam may be used directly for heating purposes, or it may be used to drive electric generators or the like, or furnish electricity on demand, or it may be used for other energy requirements.

The solar heat collector and storage system of the present invention uses an improved, simplified economical solar heat collector as source of heat energy, and the collector may be used, either alone, or in conjunction with another energy source, as the primary source of energy for a heat storage system, such as the system described in the Copending Application. However, it will become evident as the present description proceeds, that the solar heat collector of the invention may be used in a wide variety of present day solar heat systems.

A feature of the solar heat system of the invention is the provision of a solar heat collector that is constructed to cause the liquid to flow freely down the inclined roof of a building, fully exposed to the atmosphere, so as to absorb heat from the sun rays during its travels. The heat collector used in the system of the invention, unlike the prior art collectors, is simple and inexpensive, and it does not require the multiplicity of components which are incorporated into the present day prior art solar energy collectors.

DETAILED DESCRIPTION OF THE ILLUSTRATED EMBODIMENT

Figure 1:
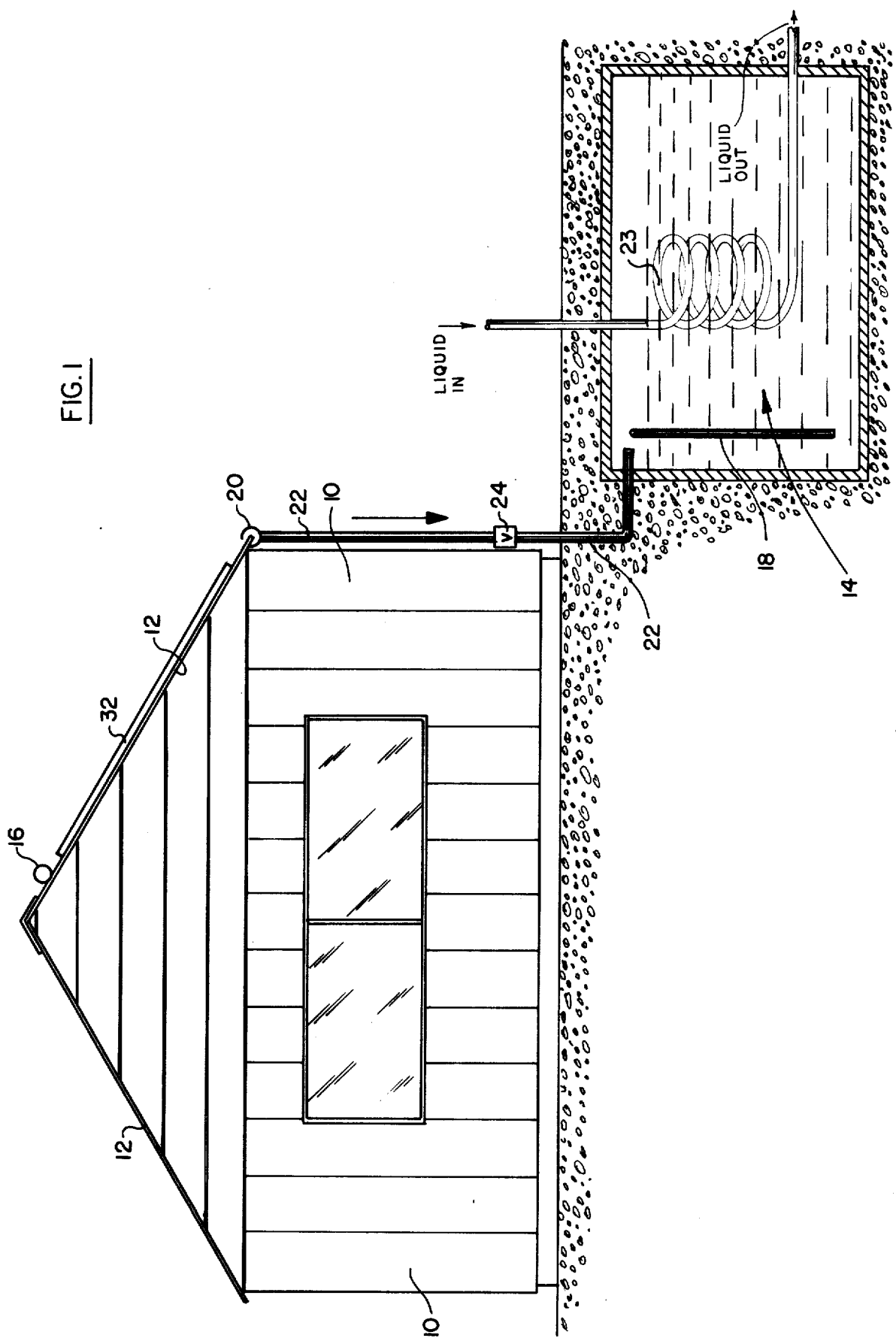
FIG. 1 is an end elevation of a building having an inclined roof, and showing the solar heat collector and storage system of the present invention in one of its embodiments.
Figure 2:
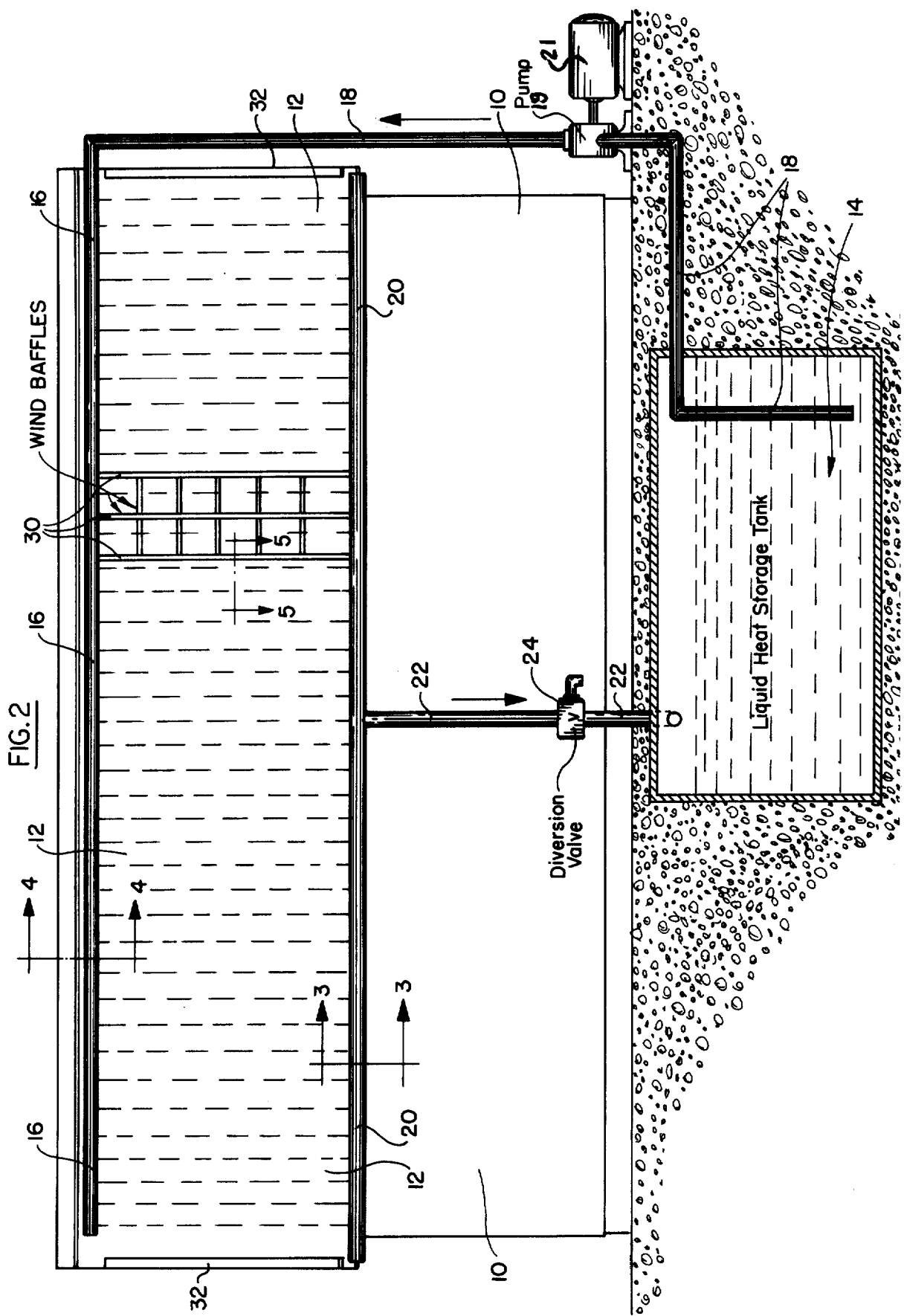
FIG. 2 is a side elevation of the building of FIG. 1, and showing further details of the solar heat collector and storage system of the particular embodiment of the invention.
Figure 3:
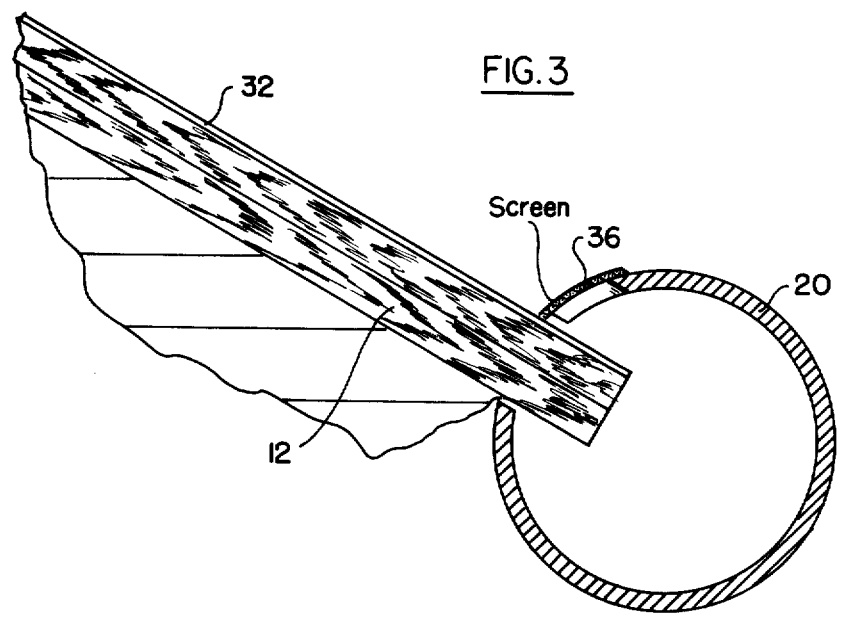
FIG. 3, 4 and 5 are sectional views, taken essentially along the lines 3—3, 4—4 and 5—5 of FIG. 2, respectively, and on an enlarged scale with respect to the representation of FIG. 2.
Figure 4:
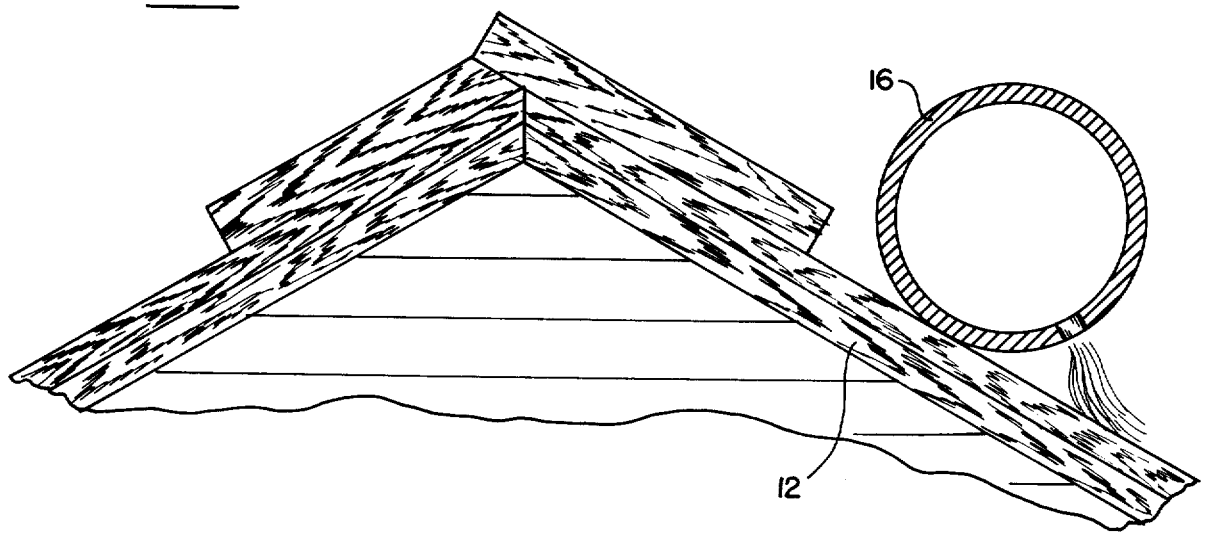
Figure 5:
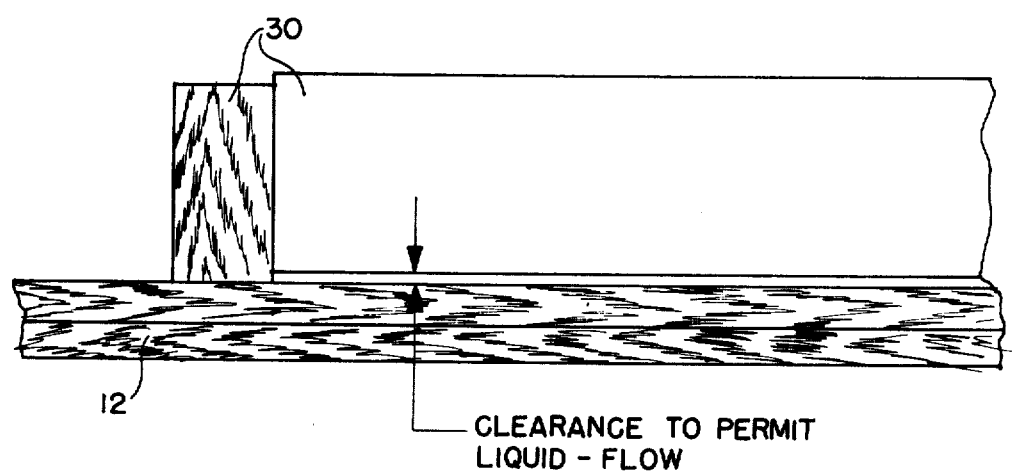

FIGS. 1-5 show a building 10 having an inclined roof 12. A storage tank 14 is buried in the ground adjacent to the building 10. The storage tank 14 may be formed of appropriate insulating material, such fire bricks, or the like, and its interior may be lined with appropriate heat insulating material such as "Interpace Plastic Insulation No. 110" or its equivalent.

The storage tank 14 is filled with a liquid solution, composed for example, of water and calcium chloride. If the storage tank 14 has a capacity equivalent to 1000 cubic feet, for example, 62 thousand pounds of water and calcium chloride solution may be contained therein, which solution has a boiling point of about 355° F. Such a solution is capable of storing, for example $22 \times 10^6$ BTU.

An apertured pipeline 16 extends along the roof 12 at an upper position on the roof. A pipeline 18 extends between the storage tank 14 and one end of pipeline 16. A pump 19, driven by a motor 21 is coupled to the pipeline 18.

The pump 19 pumps the liquid solution from the storage tank 14 through the pipeline 18 to the pipeline 16. The liquid solution in the pipeline 16 flows through the apertures in the pipeline 16 and freely down the roof 12 from the upper position on the roof to a lower position. As the liquid solution flows across the roof, it is fully exposed to the atmosphere.

A slotted pipeline collector 20 extends along the roof at the lower position to receive the liquid solution, after the liquid solution has traveled across the roof, and after the solution has been heated by the sun. A drain pipe 22 is coupled to the collector 20, and the drain pipe returns the heated liquid solution from the collector 20 back to the heat storage tank 14.

As stated above, heat may be derived from the liquid solution in tank 14 by circulating an appropriate liquid through a coiled pipe, such as pipe 23, in the solution.

A diversion valve 24 is coupled to the drain pipe 22. The valve 24 and pump motor 21 may be controlled by either a manual or automatic control, so that the valve 24 may be turned to prevent the return of the liquid solution to the storage tank 14, and the pump 18 may be de-activated, whenever the temperature of the liquid solution flowing across the roof drops below a predetermined level. The valve 24 and pump 19, for example, may be controlled by a light sensor which turns the valve and turns off the pump motor whenever the sunlight drops below a predetermined intensity level.

Appropriate wind baffles may be mounted along the roof to prevent the wind from producing excessive turbulence in the liquid solution as it flows across the roof. End guides 32 may be provided at each end of the roof to prevent the liquid solution from flowing over the ends of the roof, and to direct the liquid solution down to the collector pipe 20.

A screen 36 (FIG. 3) may be interposed across the slot in the collector pipe 20, to prevent debris from accumulating within the pipe.

If so desired, a thin sheet of black vinyl plastic, or a thin sheet of black coated aluminum, or the like, or a coating of black paint, may be placed over the roof under the water to enhance the heat absorbing properties of the water.

It will be appreciated that although a particular embodiment of the invention has been shown and described, modifications may be made. It is intended in the appended claims to cover the modifications that come within the spirit and scope of the invention.

What is claimed is:

1. A solar heat collector and storage system including: a receptable for a heat storage solution having a relatively low evaporation rate compared with water; a structure having an inclined roof; a first pipeline extending from the receptacle to an upper position on the roof; an apertured pipeline coupled to said first pipeline and extending along the roof at said upper position thereon; pumping means coupled to the first pipeline for circulating the solution from the receptacle through the first pipeline to said apertured pipeline at the upper position on the roof to permit the solution to pass through openings in said apertured pipeline and to flow freely across the roof in an exposed condition to the atmosphere from the upper position to a lower position on the roof, so that the solution may absorb heat from the sun as the solution moves across the roof from the upper position to the lower position to have a higher temperature at the lower position as compared with the temperature at the upper position; collector means comprising a slotted pipeline extending along the roof and mounted at the lower position on the roof to collect the heated solution at the lower position; a drain pipe coupled to the slotted pipeline to return the heated solution to the receptable; means in said receptacle for deriving heat from the heated solution therein; and a diversion valve coupled to the drain pipeline and settable to a position in which the flow of liquid in the drain pipeline is prevented from returning to the receptacle.

2. The solar heat collector and storage system defined in claim 1, in which the receptacle is formed of heat insulating material, and in which the receptacle is buried in the ground.

3. The solar heat collector and storage system defined in claim 1, and which includes a baffle means mounted on the roof to minimize the heat loss in the solution in the presence of wind.

4. The solar heat collector and storage system defined in claim 1, in which said solution has a higher boiling point than water and sub-zero (Fahrenheit) freezing point.

5. The solar heat collector and storage system defined in claim 4, in which said solution comprises water and calcium chloride.

6. The solar heat collector and storage system defined in claim 1, in which the receptacle is formed of heat insulating material and is buried in the ground; which includes baffle means mounted on the roof to minimize the heat loss in the solution in the presence of wind; and in which the solution comprises water and calcium chloride.

* * * * *